(12) United States Patent
Kitora et al.

(10) Patent No.: US 10,396,614 B2
(45) Date of Patent: Aug. 27, 2019

(54) ROTATING ELECTRICAL MACHINE STATOR

(71) Applicant: Mitsubishi Electric Corporation, Tokyo (JP)

(72) Inventors: Ryuichi Kitora, Tokyo (JP); Masashi Nakamura, Tokyo (JP); Masaya Inoue, Tokyo (JP); Shogo Okamoto, Tokyo (JP); Atsushi Sakaue, Tokyo (JP); Tatsuro Hino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 207 days.

(21) Appl. No.: 14/900,395

(22) PCT Filed: Sep. 18, 2013

(86) PCT No.: PCT/JP2013/075137
§ 371 (c)(1),
(2) Date: Dec. 21, 2015

(87) PCT Pub. No.: WO2015/040692
PCT Pub. Date: Mar. 26, 2015

(65) Prior Publication Data
US 2016/0149456 A1     May 26, 2016

(51) Int. Cl.
*H02K 3/38*     (2006.01)
*H02K 3/50*     (2006.01)
(Continued)

(52) U.S. Cl.
CPC ............... *H02K 3/38* (2013.01); *H02K 1/16* (2013.01); *H02K 3/12* (2013.01); *H02K 3/28* (2013.01); *H02K 3/50* (2013.01); *H02K 2213/12* (2013.01)

(58) Field of Classification Search
CPC ............ H02K 1/148; H02K 1/16; H02K 3/12; H02K 3/28; H02K 3/38; H02K 3/50; H02K 2213/12
(Continued)

(56) References Cited

U.S. PATENT DOCUMENTS

| | | | |
|---|---|---|---|
| 5,936,326 | A | 8/1999 | Umeda et al. |
| 5,952,749 | A | 9/1999 | Umeda et al. |

(Continued)

FOREIGN PATENT DOCUMENTS

| | | |
|---|---|---|
| JP | 11-098788 A | 4/1999 |
| JP | 2006-187164 A | 7/2006 |

(Continued)

OTHER PUBLICATIONS

Communication dated Sep. 6, 2016, from the Japanese Patent Office in counterpart Japanese application No. 2015-537464.
(Continued)

*Primary Examiner* — Quyen P Leung
*Assistant Examiner* — Ahmed Elnakib
(74) *Attorney, Agent, or Firm* — Sughrue Mion, PLLC; Richard C. Turner

(57) ABSTRACT

A stator of a rotating electrical machine includes: a plurality of annularly arranged stator cores; a stator winding attached to slots of the stator cores; and a shell (22) that retains the stator cores. In the stator of the rotating electrical machine, the ends of coil terminal wires (19), (20) on the innermost circumferential side and the outermost circumferential side of each slot are oriented in the axial direction of the stator; and side surfaces of the ends of the terminal wires (19), (20) are brought into contact with each other and are welded above the coil end (21) of the stator winding.

7 Claims, 3 Drawing Sheets

(51) Int. Cl.
    *H02K 3/12*    (2006.01)
    *H02K 3/28*    (2006.01)
    *H02K 1/16*    (2006.01)

(58) Field of Classification Search
    USPC .................................................. 310/71, 201
    See application file for complete search history.

(56) References Cited

U.S. PATENT DOCUMENTS

| | | | |
|---|---|---|---|
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1* | 1/2001 | Kusase | H02K 3/12 310/180 |
| 6,181,045 B1 | 1/2001 | Umeda et al. | |
| 6,198,190 B1 | 3/2001 | Umeda et al. | |
| 6,291,918 B1 | 9/2001 | Umeda et al. | |
| 6,459,177 B1 | 10/2002 | Nakamura et al. | |
| 6,459,186 B1 | 10/2002 | Umeda et al. | |
| 8,030,812 B2* | 10/2011 | Tanaka | H02K 3/12 310/201 |
| 2002/0047445 A1* | 4/2002 | Ooiwa | H02K 3/30 310/179 |
| 2005/0248229 A1* | 11/2005 | Even | H02K 3/12 310/180 |
| 2006/0208594 A1* | 9/2006 | Kashihara | H02K 3/28 310/179 |
| 2006/0220488 A1* | 10/2006 | Koike | H02K 3/28 310/179 |
| 2009/0001841 A1* | 1/2009 | Naganawa | H02K 3/12 310/207 |
| 2009/0200888 A1* | 8/2009 | Tanaka | H02K 3/12 310/195 |
| 2010/0207466 A1* | 8/2010 | Endo | H02K 3/522 310/71 |
| 2011/0175472 A1 | 7/2011 | Koike et al. | |
| 2011/0198953 A1* | 8/2011 | Shinohara | H02K 3/12 310/71 |
| 2011/0241461 A1* | 10/2011 | Utaka | H02K 3/12 310/71 |
| 2012/0161566 A1* | 6/2012 | Ikuta | H02K 1/185 310/179 |
| 2012/0161567 A1 | 6/2012 | Gorohata | |
| 2013/0300246 A1* | 11/2013 | Kaimori | H02K 3/32 310/201 |
| 2015/0061434 A1* | 3/2015 | Asano | H02K 3/12 310/71 |
| 2015/0171693 A1* | 6/2015 | Sakaue | H02K 3/38 310/215 |

FOREIGN PATENT DOCUMENTS

| | | |
|---|---|---|
| JP | 2007-037344 A | 2/2007 |
| JP | 2009-219343 A | 9/2009 |
| JP | 2011-229367 A | 11/2011 |
| JP | 2012-139075 A | 7/2012 |
| JP | 2012-143068 A | 7/2012 |

OTHER PUBLICATIONS

Communication dated May 10, 2016 from the Japanese Patent Office in counterpart application No. 2015537464.
English translation of JP 2012-139075A submitted Dec. 10, 2015.
English translation of JP 2009-219343A1 submitted Dec. 10, 2015.
English translation of JP 2007-037344A submitted Dec. 10, 2015.
English translation of JP 2006-187164A submitted Dec. 10. 2015.
Communication dated Jun. 2, 2017, issued from the State Intellectual Property Office of People's Republic of China in counterpart Application No. 201380079646.7.
Communication dated May 17, 2017 from the European Patent Office in counterpart application No. 13893881.6.
International Search Report for PCT/JP2013/075137 dated Dec. 21, 2013.
Communication dated Jan. 10, 2018, from State Intellectual Property Office of the P.R.C. in counterpart application No. 201380079646.7.
Communication dated Jul. 3, 2018, 2018, from the State Intellectual Property Office of People's Republic of China in counterpart Application No. 201380079646.7.

* cited by examiner

ROTATING ELECTRICAL MACHINE STATOR

CROSS REFERENCE TO RELATED APPLICATIONS

This application is a National Stage of International Application No. PCT /JP2013/075137 filed Sep. 18, 2013, the contents of all of which are incorporated herein by reference in their entirety.

TECHNICAL FIELD

The present invention relates to a stator of a rotating electrical machine, such as a motor and a generator, to be mounted in a vehicle and, more particularly, relates to the shape of a stator winding terminal.

BACKGROUND ART

As a stator of a conventional rotating electrical machine, there is one disclosed in Patent Document 1. The rotating electrical machine stator disclosed in Patent Document 1 includes an annular stator core having a plurality of slots in a circumferential direction and a stator winding composed of a plurality of conductors wound around the stator core. Then, a configuration is made such that the stator winding has a plurality of phase windings formed by connecting a plurality of conductors and a connection part of a crossover wire that connects terminals of the phase windings is provided on a coil end part of the stator winding, the coil end part being protruded from the axial edge surface of the stator core; and thus forming a shape in which the connection part of the crossover wire does not protrude to the outer circumferential side or the inner circumferential side of the stator and achieving downsizing of the size of the stator.

PRIOR ART DOCUMENT

Patent Document

Patent Document 1: Japanese Unexamined Patent Publication No. 2011-229367

SUMMARY OF THE INVENTION

Problems to be Solved by the Invention

However, in Patent Document 1, of the terminals of the phase windings to be connected, a winding terminal on the outer circumferential side is bent in an inner circumferential direction and a winding terminal on the inner circumferential side is bent in an outer circumferential direction; and their end surfaces or their side surfaces are welded. In this case, a problem exists in that welding work of the connection part is difficult and a variation occurs in finish.

One feasible way to solve the problem is a method in which winding terminals to be connected are bent to the outer circumferential side and are connected in axially lapped relation above the core back, as shown in FIG. 8.

However, as for this method, in a structure provided with a shell 22 which is for retaining a plurality of stator cores 11, the shell 22 needs to be more axially lengthened than the stator core 11 in order to retain the stator core 11; and thus, an axial distance D between terminal wires 19, 20 and the edge surface of the shell 22 becomes nearer.

Accordingly, the height of a coil end 21 increases in order to increase the distance D by sufficiently securing the tool insertion width between a welding part and the shell.

If the height of the coil end 21 increases, the rotating electrical machine increases in size; and accordingly, a problem arises in that the rotating electrical machine is difficult to be mounted in a hybrid electric vehicle (HEV), an electric vehicle (EV), or the like, whose layout limitation is severe.

The present invention has been made to solve the above described problem, and an object of the present invention is to provide a stator of a rotating electrical machine in which welding workability that is for joining winding terminals is good, quality can be stabilized, and downsizing of a device can be achieved by lowering coil ends.

Means for Solving the Problems

According to the present invention, there is provided a stator of a rotating electrical machine including: a plurality of stator cores which have a plurality of slots in a circumferential direction and are annularly arranged; a stator winding attached to the slots of the stator cores; and a shell that retains the stator cores. The stator winding is composed of a plurality of coils, each coil being formed by winding a conductive wire which is insulation-covered and continuous with no connection part; each coil is provided with terminal wires which are each protruded toward one side coil end from the inner circumferential end and the outer circumferential end; end parts on one side of the terminal wires of the plurality of coils are connected; the coil is attached in plural layers to each slot; and the coil terminal wires are arranged at a predetermined angle pitch over the whole circumference of the stator. In the stator of the rotating electrical machine, the ends of the coil terminal wires on the innermost circumferential side and the outermost circumferential side of each slot are oriented to the axial direction of the stator; side surfaces of the terminal wire ends are brought into contact with each other above the coil end of the stator winding to form a joint part; and the joint part is joined by welding.

Advantageous Effect of the Invention

According to a stator of a rotating electrical machine of the present invention, in the stator of the rotating electrical machine equipped with the shell that retains the stator cores, there can be obtained a stator of a rotating electrical machine in which welding workability that is for joining winding terminals is good, quality can be stabilized, and downsizing of a device can be achieved by lowering the coil end.

The foregoing and other objects, features, and advantageous effects of the present invention will become more apparent from detailed description in the following embodiments and description in the accompanying drawings.

MODE FOR CARRYING OUT THE INVENTION

Figure 1:
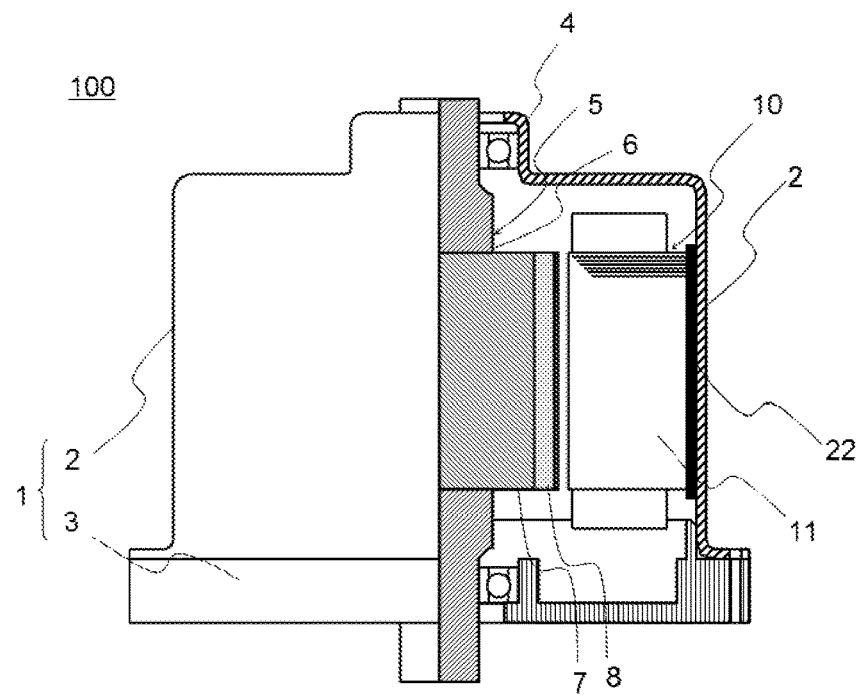
FIG. 1 is a partially sectional plan view showing the configuration of a rotating electrical machine according to Embodiments 1 to 3 of the present invention.

Hereinafter, embodiments of a stator of a rotating electrical machine of the present invention will be described with reference to drawings. Incidentally, the same reference numerals as those shown in the respective drawings represent the same or corresponding elements.

Embodiment 1

Figure 2:
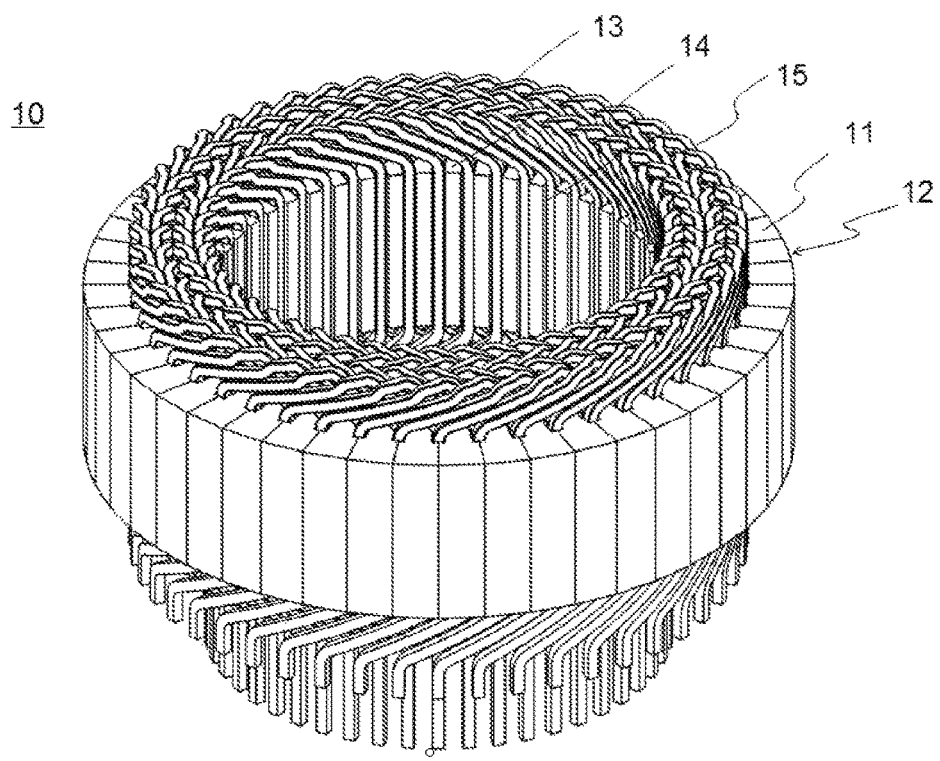
FIG. 2 is a perspective view showing the configuration of a stator according to Embodiments 1 to 3 of the present invention.
Figure 3:
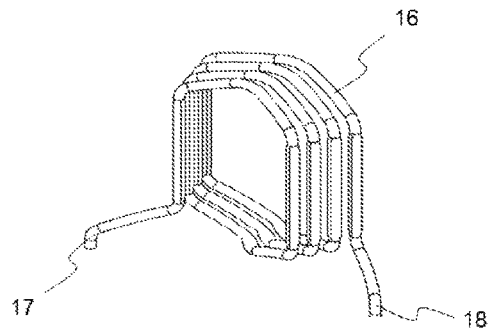
FIG. 3 is a perspective view showing the configuration of a coil according to Embodiments 1 to 3 of the present invention.
Figure 4:
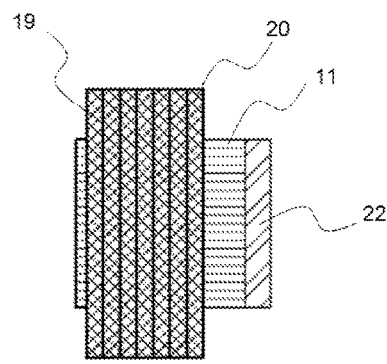
FIG. 4 is a sectional view of a coil and a slot according to Embodiments 1 to 3 of the present invention.

FIG. 1 is a partially sectional plan view showing the configuration of a rotating electrical machine according to Embodiment 1 of the present invention; FIG. 2 is a perspective view showing the configuration of a stator according to the same embodiment; FIG. 3 is a perspective view showing the configuration of a coil according to the same embodiment; and FIG. 4 is a sectional view of a coil and a slot according to the same embodiment. Incidentally, the configuration shown in these FIG. 1 to FIG. 4 is common to Embodiment 1 to Embodiment 3 to be described later.

First, the configuration of the rotating electrical machine will be described with reference to FIG. 1 to FIG. 4.

In FIG. 1 to FIG. 4, a rotating electrical machine 100 includes: a housing 1 having a bottomed cylindrical frame 2 and an end plate 3 that blocks an opening of the frame 2; a cylindrical shell 22 retained on the inside of the frame 2; a stator 10 serving as an armature that is fixed in an internally fitting state to a cylindrical part of the shell 22; and a rotor 5 which is fixed to a rotating shaft 6 rotatably supported to a bottom part of a frame 2 and an end plate 3 via bearings 4 and rotatably disposed on the inner circumferential side of the stator 10.

The rotor 5 is a permanent magnet rotor equipped with a rotor core 7 fixed to the rotating shaft 6 inserted into an axial center position and permanent magnets 8 embedded on the outer circumferential surface side of the rotor core 7 and arranged at a circumferentially equal pitch to constitute magnetic poles. Incidentally, the rotor 5 is not limited to the permanent magnet rotor, but there may be used a cage rotor in which non-insulated rotor conductors are placed in slots of a rotor core and both sides are short-circuited by short-circuit rings and a wound rotor in which insulated conductive wires are attached to slots of a rotor core.

As shown in FIG. 2, the stator 10 includes a plurality of stator cores 11 annularly arranged and a stator winding 15 attached to the stator core 11. The stator core 11 is manufactured, for example, by integrally laminating a plurality of electromagnetic steel sheets punched in a certain shape. The stator core 11 includes: an annular yoke 12; and teeth 13 which are each extended from the inner circumferential surface of the yoke 12 to radially inner side and are arranged at a circumferentially equal pitch.

Then, a space formed between the teeth 13 is a slot 14.

As shown in FIG. 3, the stator winding 15 includes coils 16.

The coils 16 are each formed by winding a conductive wire several times, the conductive wire being made of a thin wire such as copper wire and aluminum wire and being insulation-covered and continuous with no connection part. Terminal wires of the coil 16 are each protruded from an inner circumferential end 17 and an outer circumferential end 18. The plurality of coils 16 are attached to the slots 14 of the stator cores 11 in a predetermined state; and end parts on one side are connected to constitute the stator winding 15 of each phase.

When a terminal part of the coil 16 is connected by welding, an insulation film of the terminal part is peeled off and a conductor is exposed.

As shown in FIG. 4, the coil 16 is arranged in four or more layers in each slot in the radial direction; and a terminal wire 19 and a terminal wire 20 of the coil 16 are protruded from the innermost circumferential side (a first layer) and the outermost circumferential side (for example, an eighth layer) of each slot, respectively.

Figure 5:
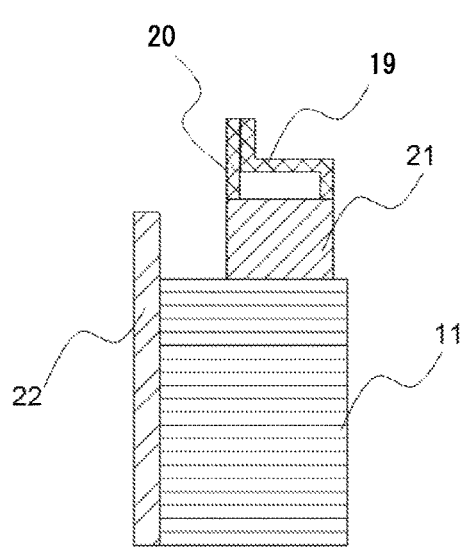
FIG. 5 is a sectional view showing a relevant part of the stator according to Embodiment 1 of the present invention.

FIG. 5 is a sectional view showing a relevant part of the stator of Embodiment 1 of the present invention and shows the joint state of the terminal wires.

As for the terminal wire 19 on the inner circumferential side and the terminal wire 20 on the outer circumferential side of each slot, as shown in FIG. 5, the terminal wire 19 is firstly bent to the outer circumferential side above the coil end 21; the end of the terminal wire 19 is secondarily bent so as to be oriented in the axial direction of the stator; the side surface of the terminal wire 19 is brought into contact with the side surface of the terminal wire 20 to form a joint part above the coil end 21; and the terminal wires 19, 20 are positioned so as to be the same height between the end surfaces of the respective terminal wires over substantially the whole circumference of the stator 10.

Then, the joint parts of the terminal wires 19, 20 whose side surfaces are thus brought into contact with each other are connected over substantially the whole circumference of the stator 10. The connection is performed by, for example, tungsten inert gas (TIG) welding.

Incidentally, there exists a coil 16 which is provided with connection terminals above the coil end 21 and whose terminal parts are not bent. Then, such a coil 16 is joined via the connection terminals. The terminal parts to be joined to the connection terminals are oriented in the axial direction.

As described above, when the connection terminals are used in the case of joining the terminal wires, bending work of the terminal wires of the connection terminal parts can be omitted.

Furthermore, in the case of insulating the welding parts whose insulation films are peeled off, all coil terminals are oriented in the axial direction at substantially the same height; and therefore, all film peeled-off parts can be insulated in one process by fluidization dip. Then, insulation material can be avoided from being applied to a place other than a place where an insulation part is needed.

According to the thus configured stator of the rotating electrical machine of Embodiment 1 of the present invention, the following excellent operational advantages can be obtained.

(1) Welding can be performed in a state where the terminal wires are oriented in the axial direction above the coil end; and therefore, a clearance which is for inserting a tool between the edge surface of the shell and the welding part, the clearance being the problem in the case of welding above the core back, does not need to be provided, the coil end can be lowered, and downsizing of the stator can be achieved.

(2) The welding is performed above the coil end and therefore the welding tool is easily brought close; and the welding part exists on the outer diameter side and thus workability during welding is improved. Furthermore, the terminal wire is welded on the outer circumferential side; and thus, the distance between the terminal wires whose insulation films near the welding part are peeled off becomes long and insulation quality is improved.

(3) The side surfaces of the terminal wires are brought into contact with each other during welding; and thus, the ends of the terminal wires become parallel and welding can be performed without depending on the state of cutting surfaces. Therefore, workability is good and quality is stabilized.

(4) A clamp at the ends pressurizes in the direction of the side surfaces of the conductive wires; and therefore, an effect is exhibited in that the conductive wires do not buckle.

(5) The terminal wires do not protrude to the core back; and therefore, the core back of the stator can be received or pressed in the case of fitting the stator to the shell.

(6) In addition, terminals are generally brought into contact with each other during welding; however, in the structure of the stator covered by the present invention, the coils are radially aligned in the slots. Accordingly, if the coil terminal wires are positively brought into contact with each other, a first winding, that is, the innermost diameter coil is stuck out to the inner diameter side and is likely to be protruded from the slot. Then, if the coil is stuck out to the inner diameter side, a gap is formed between the coils and a space factor lowers. However, the gap is provided at the welding part and the ends of the coil terminal wires are clamped and welded; and thus, the first winding certainly moves to the outer circumferential side and the space factor can be improved.

Embodiment 2

Figure 6:
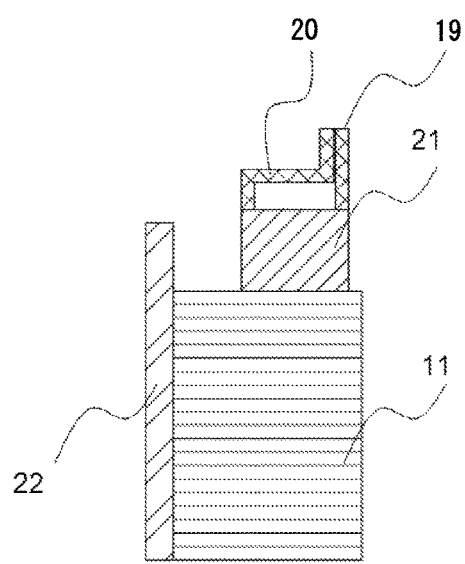
FIG. 6 is a sectional view showing a relevant part of the stator according to Embodiment 2 of the present invention.

FIG. 6 is a sectional view showing a relevant part of a stator according to Embodiment 2 of the present invention, and the stator of Embodiment 2 is different in a method of bending a terminal wire 19 and a terminal wire 20, as compared to Embodiment 1. More specifically, in the stator of Embodiment 2, as for the terminal wire 19 on the inner circumferential side and the terminal wire 20 on the outer circumferential side of the coil 16 arranged in each slot 14, as shown in FIG. 6, the terminal wire 20 is firstly bent to the inner circumferential side above a coil end 21; the end of the terminal wire 20 is secondarily bent so as to be oriented in the axial direction of the stator; the side surface of the terminal wire 19 is brought into contact with the side surface of the terminal wire 20 to form a joint part above the coil end 21; and the terminal wires 19, 20 are positioned so as to be the same height between the end surfaces of the respective terminal wires over substantially the whole circumference of the stator 10.

Then, the joint parts of the terminal wires 19, 20 whose side surfaces are thus brought into contact with each other are connected over substantially the whole circumference of the stator 10 by, for example, TIG welding.

According to the thus configured Embodiment 2, effects exist that a welding position is located at the inner circumferential side above the coil end, whereby a movement distance of a tool becomes short and a welding work time can be shortened in the case of welding in order over the whole circumference of the stator, in addition to the same effects as Embodiment 1.

Embodiment 3

Figure 7:
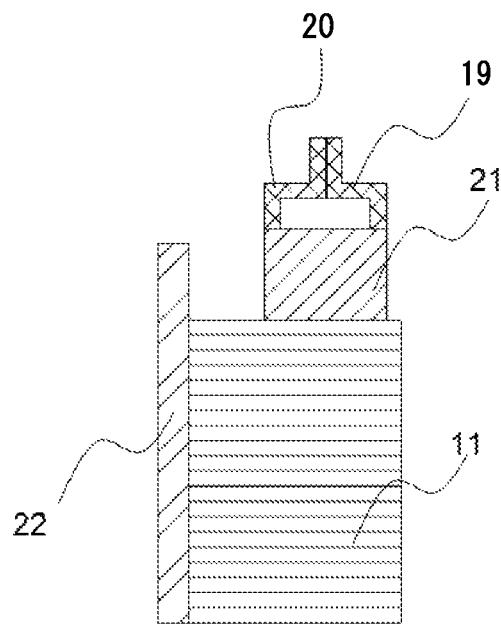
FIG. 7 is a sectional view showing a relevant part of the stator according to Embodiment 3 of the present invention.
Figure 8:
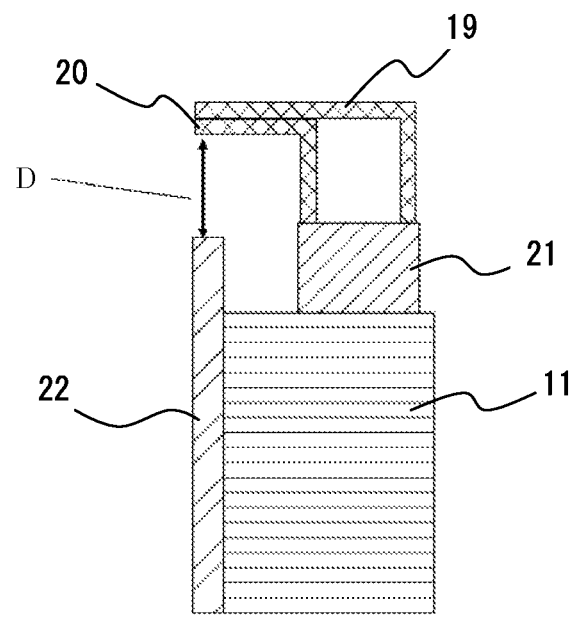
FIG. 8 is a reference view showing a relevant part of a stator for explaining a background art of the present invention.

FIG. 7 is a sectional view showing a relevant part of a stator according to Embodiment 3 of the present invention, and the stator of Embodiment 3 is different in a method of bending a terminal wire 19 and a terminal wire 20, as compared to Embodiments 1, 2.

More specifically, in the stator of Embodiment 3, as for the terminal wire 19 on the inner circumferential side and the terminal wire 20 on the outer circumferential side of the coil 16 arranged in each slot, as shown in FIG. 7, the terminal wire 19 is firstly bent to the outer circumferential side above a coil end 21; and the end of the terminal wire 19 is secondarily bent so as to be oriented in the axial direction of the stator. Furthermore, the terminal wire 20 on the outer circumferential side is also firstly bent to the inner circumferential side above the coil end 21; the end of the terminal wire 20 is secondarily bent so as to be oriented in the axial direction of the stator; the side surface of the terminal wire 19 is brought into contact with the side surface of the terminal wire 20 to form a joint part above the coil end 21; and the terminal wires 19, 20 are positioned so as to be the same height between the end surfaces of the respective terminal wires over substantially the whole circumference of the stator 10.

Then, the joint parts of the terminal wires 19, 20 whose side surfaces are thus brought into contact with each other are connected by, for example, TIG welding over substantially the whole circumference of the stator 10.

According to the thus configured Embodiment 3, bending at a close distance is applied to both end coils, whereby rigidity of the stator is enhanced and seismic adequacy can be improved, in addition to the same effects as Embodiment 1.

INDUSTRIAL APPLICABILITY

The present invention is useful as a stator of a rotating electrical machine to be mounted in a vehicle such as an EV and an HEV and to be required to provide a small size and a high output.

DESCRIPTION OF REFERENCE NUMERALS

1: Housing, 2: Frame, 5: Rotor, 7: Rotor core, 8: Permanent magnet, 10: Stator, 11: Stator core, 12: Yoke, 13: Tooth, 14: Slot, 15: Stator winding, 16: Coil, 17: Inner circumferential end, 18: Outer circumferential end, 19, 20: Terminal wire, 21: Coil end, 22: Shell

The invention claimed is:

1. A stator of a rotating electrical machine comprising:
a plurality of stator cores which have a plurality of slots in a circumferential direction and are annularly arranged;
a stator winding attached to the slots of said stator cores; and
a shell that retains said stator core,
said stator winding being composed of a plurality of coils, each coil being formed by winding a conductive wire which is insulation-covered and continuous with no connection part;
each coil being provided with terminal wires which are each protruded toward one side of coil end from an inner circumferential end and an outer circumferential end;
end parts on one side of the terminal wires of the plurality of coils, being connected;
the coil being arranged in plural layers in each slot; and
the terminal wires being arranged at a predetermined angle pitch over the whole circumference of said stator, wherein ends of the terminal wires protruded from an innermost circumferential side and an outermost circumferential side of each slot are oriented in an axial direction of said stator, and wherein side surfaces, facing a radial direction of the said stator, of the ends of the terminal wires protruded from an innermost circumferential side and an outermost circumferential side of each slot in the axial direction are brought into contact with each other above the coil end of said stator winding to form a joint part, protruding in the axial direction, over the whole circumference of the said stator, and wherein the joint part is joined by welding.

2. The stator of the rotating electrical machine according to claim 1, wherein, of the terminal wires protruded from the innermost circumferential side and the outermost circumferential side of the slot, the terminal wire on the innermost circumferential side is bent at least two or more times including bending to the outermost circumferential side above the coil end.

3. The stator of the rotating electrical machine according to claim 1, wherein, of the terminal wires protruded from the innermost circumferential side and the outermost circumferential side of the slot, the terminal wire on the outermost circumferential side is bent at least two or more times including bending to the innermost circumferential side above the coil end.

4. The stator of the rotating electrical machine according to claim 1, wherein both of the terminal wires protruded from the innermost circumferential side and the outermost circumferential side of the slot are bent two or more times above the coil end.

5. The stator of the rotating electrical machine according to claim 1, wherein an axial height of the terminal wire ends are equal over the whole circumference of said stator.

6. The stator of the rotating electrical machine according to claim 5, wherein a welding part of the terminal wires is insulated by fluidization dip.

7. The stator of the rotating electrical machine according to claim 1, wherein said stator core is configured by integrally laminating a plurality of electromagnetic steel sheets punched in a certain shape.

* * * * *